(12) United States Patent
Van Benthem et al.

(10) Patent No.: US 6,387,496 B1
(45) Date of Patent: May 14, 2002

(54) CONDENSATION POLYMER CONTAINING HYDROXYALKYLAMIDE GROUPS

(75) Inventors: Rudolfus A. T. M. Van Benthem, Sittard; Johan Rietberg, Zwolle, both of (NL); Dirk A. W. Stanssens, Houthalen (BE)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/941,793

(22) Filed: Aug. 30, 2001

Related U.S. Application Data

(62) Division of application No. 09/534,326, filed on Mar. 24, 2000, which is a continuation of application No. PCT/NL98/00546, filed on Sep. 22, 1998.

(30) Foreign Application Priority Data

Oct. 1, 1997 (NL) .............................................. 1007186

(51) Int. Cl.[7] ........................... B32B 15/02; G03G 9/00; C28G 69/26
(52) U.S. Cl. ....................... 428/402; 528/271; 528/288; 528/332; 528/335; 528/403; 528/422; 525/438; 525/540; 430/109
(58) Field of Search .................................. 528/271, 288, 528/332, 335, 403, 422; 525/438, 540; 428/402; 430/109

(56) References Cited

U.S. PATENT DOCUMENTS 3,652,501 A * 3/1972 Albers et al.
3,709,858 A * 1/1973 Albers et al.

FOREIGN PATENT DOCUMENTS

WO       WO94/03545    * 2/1994

* cited by examiner

*Primary Examiner*—Samuel A. Acquah
(74) *Attorney, Agent, or Firm*—Pillsbury Winthrop LLP

(57) ABSTRACT

The invention relates to a linear or branched polymer containing ester groups and at least one amide group in the backbone, having hydroxyalkylamide end groups and having a weight average molecular mass of $\geq 800$ g/mol. The invention also relates to an entirely or partly modified polymer. The polymer according to the invention can for example be obtained by reaction of a cyclic anhydride and an alkanolamine to form a β-hydroxyalkylamide, after which a polyesteramide is obtained through polycondensation. The polymers according to the invention can, for example, be used in thermosetting powder-paint compositions.

11 Claims, No Drawings

CONDENSATION POLYMER CONTAINING HYDROXYALKYLAMIDE GROUPS

This is a Divisional of U.S. application Ser. No. 09/534,326 filing date Mar. 24, 2000, which is a Continuation of International Application No. PCT/NL98/00546 filed Sep. 22, 1998 which designated the U.S. and that International Application was published under PCT Article 21(2) in English.

The invention relates to a linear or branched condensation polymer containing ester groups and at least one amide group in the backbone, having at least one hydroxyalkylamide endgroup and having a weight average molecular mass of $\geq 800$ g/mol.

Preferably, the polymer contains at least two groups according to formula (I)

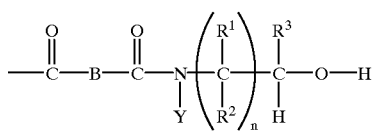

(I)

in which

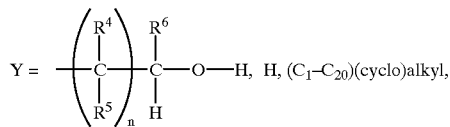

or $(C_6-C_{10})$ aryl,

B=$(C_2-C_{24})$, optionally substituted, aryl or (cyclo)alkyl aliphatic diradical, $R^1$, $R^2$, $R^3$, $R^4$, $R^5$ and $R_6$ may, independently of one another, be the same or different, H, $(C_6-C_{10})$ aryl or $(C_1-C_8)$(cyclo)alkyl radical and n=1–4.

More preferably the polymer contains at least two groups according to formula (II):

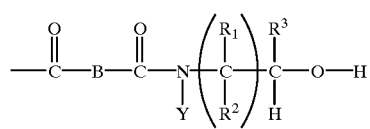

(II)

in which

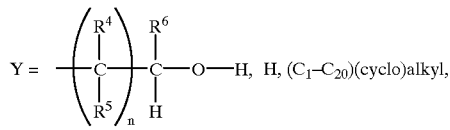

or $(C_6-C_{10})$ aryl,

B=$(C_2-C_{24})$, optionally substituted, aryl or (cyclo)alkyl aliphatic diradical, and $R^1$, $R^2$, $R^3$, $R^4$, $R^5$ and $R^6$ may, independently of one another, be the same or different, H, $(C_6-C_{10})$ aryl or $(C_1-C_8)$(cyclo)alkyl radical.

According to a further preferred embodiment, the polymer containing hydroxyalkylamide groups is a polymer according to formula (III):

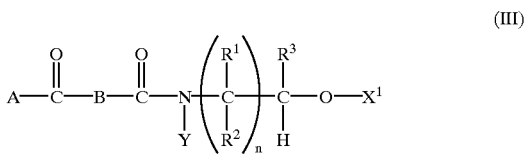

(III)

in which:

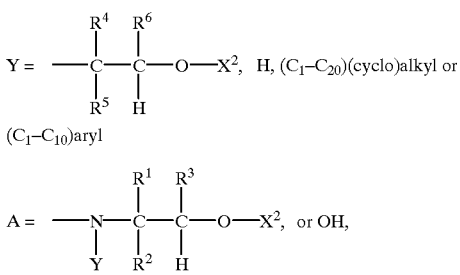

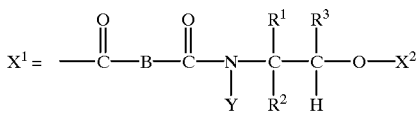

B=$(C_2-C_{24})$, optionally substituted, aryl or (cyclo)alkyl aliphatic diradical,

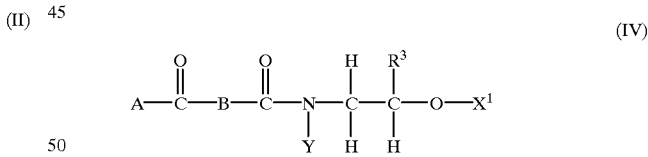

$X^2$=H or $X^1$ and $R^1$, $R^2$, $R^3$, $R^4$, $R^5$ and $R^6$ may, independently of one another, be the same or different, H, $(C_6-C_{10})$ aryl or $(C_1-C_8)$(cyclo)alkyl radical or $CH_2-OX^2$.

In formulas (I), (II) and (III) R groups may together or with neighbouring carbon atoms form part of a cycloalkyl group.

According to another preferred embodiment of the invention, the polymer containing β-hydroxyalkylamide groups is a polymer according to formula (IV):

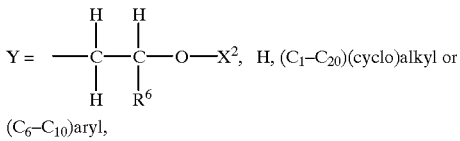

(IV)

in which:

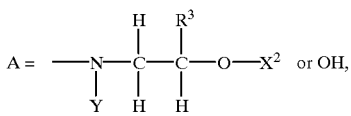

B=$(C_2-C_{20})$, optionally substituted, aryl or (cyclo)alkyl aliphatic diradical,

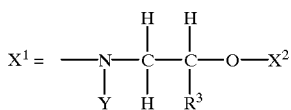

$X^2$=H or $X^1$, $R^3$=H or $(C_6-C_{10})$ aryl or $(C_1-C_8)$alkyl radical and $R^6$=H or $(C_6-C_{10})$ aryl or $(C_1-C_8)$alkyl radical.

The weight average molecular mass of the polymer according to the invention is generally between 800 and 50,000, and preferably between 1000 g/mol and 25,000 g/mol.

The number average molecular mass is generally between 600 and 10,000 and preferably between 700 and 4000.

The hydroxyalkylamide functionality is generally between 2 and 250 and preferably between 5 and 50.

Functionality is the average number of reactive groups of the specific type per molecule in. the polymer composition.

According to another preferred embodiment of the invention the polymer's hydroxyalkylamide functionality of the polymer is ≧5 and the polymer containing β-hydroxyalkylamide groups is a polymer represented by formula (V):

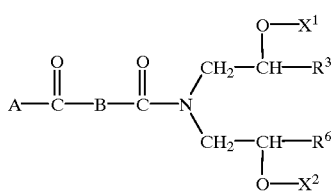

(V)

in which:

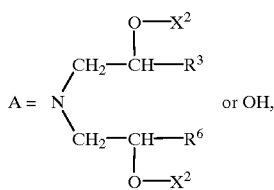

B=$(C_2-C_{12})$, optionally substituted, aryl or (cyclo)alkyl aliphatic diradical,

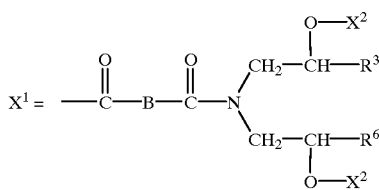

$X^2$=H or $X^1$, $R^3$=H or $(C_6-C_{10})$ aryl or $(C_1-C_8)$ (cyclo)alkyl radical and $R^6$=H or $(C_6-C_{10})$ aryl or $(C_1-C_8)$ (cyclo)alkyl radical Preferably $R^3$ and $R^6$ are $(C_1-C_4)$ alkyl.

According to another preferred embodiment of the invention $R^3$ and $R^6$ are methyl or ethyl.

B may be saturated or unsaturated.

B may be substituted with for example a $(C_1-C_{26})$ alkyl group, which may be saturated or unsaturated; preferably $C_1$ is used.

B may be for example a (methyl-)1,2-ethylene, (methyl-) 1,2-ethylidene, 1,3-propylene, (methyl-)1,2-cyclohexyl, (methyl-)1,2-phenylene, 1,3-phenylene, 1,4-phenylene, 2,3-norbornyl, 2,3-norbornen-5-yl and/or (methyl-)1,2 cyclohex-4-enyl radical.

Depending on the starting monomers chosen, the variables B, $R^1$, $R^2$, $R^3$, $R^4$, $R^5$ and $R^6$ in the molecule or mixture of molecules can be selected to be the same or different per variable.

The polymer composition according to the invention is generally a composition comprising higher and lower oligomers, which usually contains less than 50 wt. %, preferably less than 30 wt. %, of oligomers having a molecular weight smaller than 600.

The polyesteramide according to the invention can for example be obtained through polycondensation of mono- and/or bis-hydroxyalkylamides of bivalent carboxylicacids.

The monohydroxyalkylamide of a bivalent carboxylic acid generally has the formula (VI):

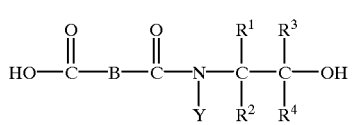

(VI)

and the bishydroxyalkylamide of a bivalent carboxylic acid generally can be represented by formula (VII):

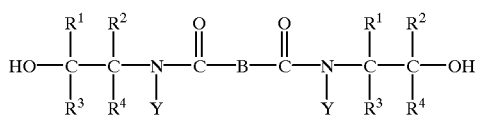

(VII)

wherein $R^1$, $R^2$, $R^3$ and $R^4$ may, independently of one another, be the same or different, H, $(C_6-C_{10})$ aryl or $(C_1-C_8)$ (cyclo)alkyl radical.

Consequently a lineair polymer according to the invention generally comprises the amide and the ester groups alternating along the chain as follows:

wherein a diamide is coupled with alternating ester (E)

amide (A) groups.

A branched polymer according to the invention generally comprises the amide and the ester groups alternating along the main and side chains as follows:

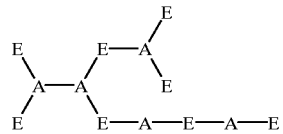

wherein a diamide is coupled with alternating ester (E)

amide (A) groups.

In the branched polymers according to the invention (β)-hydroxyalkylamide groups can be present both as an endgroup

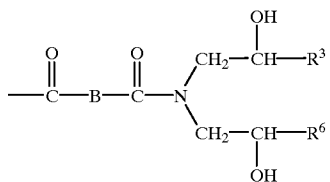

and as a pendant side chain group

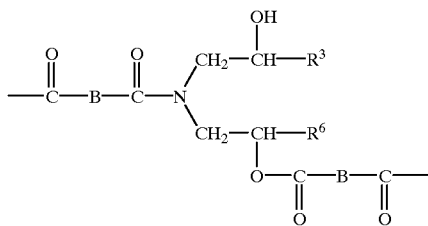

Generally, the molar amount of amide bounds in the chain is higher than the amount of ester bounds.

The polymer according to the invention comprises at least 60% by weight of the products represented by the formulas (III)–(V).

Due to side reactions during the preparation of the polymer it is possible that the composition according to the invention comprises also for example secondary amine groups having the formula (VIII):

(VIII)

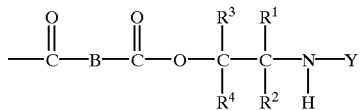

wherein:

$R^1$, $R^2$, $R^3$ and $R^4$ may, independently of one another, be the same or different, H, ($C_6$–$C_{10}$) aryl or ($C_1$–$C_8$) (cyclo)alkyl radical.

The polymer according to the invention can, also be obtained in a one-step procedure by reacting a cyclic anhydride and an alkanolamine, at a temperature between for example about 20° C. and about 100° C., to form a hydroxyalkylamide, after which, at a temperature between, for example, 120° C. and 250° C., a polyesteramide is obtained through polycondensation with water being removed through distillation.

The reaction can take place without a solvent, but also in water or in an organic solvent.

The removal of water through distillation can take place at a pressure higher than 1 bar, in a vacuum or azeotropically.

Preferably, the cyclic anhydride is an anhydride according to formula (IX):

(IX)

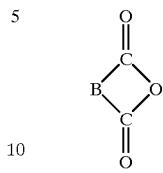

in which B has the meaning specified above.

Examples of suitable cyclic anhydrides include phthalic anhydride, tetrahydrophthalic anhydride, naphtalenic dicarboxylic anhydride, hexahydrophthalic anhydride, 5-norbornene-2,3-dicarboxylic anhydride, norbornene-2,3-dicarboxylic anhydride, naphtalenic dicarboxylic anhydride, 2-dodecen-1-yl-succinic anhydride, maleic anhydride, (methyl)succinic anhydride, glutaric anhydride, 4-methylphthalic anhydride, 4-methylhexahydrophthalic anhydride, 4-methyltetrahydrophthalic anhydride and the maleinised alkylester of an unsaturated fatty acid.

Preferably the alkanol is an alkanolamine according to formula (X):

(X)

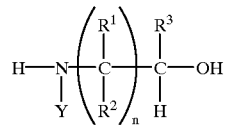

in which:

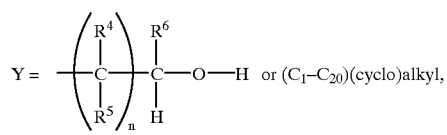

$R^1$, $R^2$, $R^3$, $R^4$, $R^5$ and $R^6$ may, independently of one another, be the same or different, H, ($C_6$–$C_{10}$) aryl or ($C_1$–$C_8$) (cyclo)alkyl radical or $CH_2OH$ and n=1–4.

More preferably n=1. The alkanolamine may be a monoalkanolamine, a dialkanolamine, a trialkanolamine or a mixture hereof.

If monoalkanolamines are used in one of the possible polymer syntheses, linear polymers with a functionality of 2 can be obtained. Depending on the application desired, a linear or an entirely or partly branched polymer can be chosen, in which case the degree of branching can be set via the alkanolamines chosen.

If a highly branched structure with a high functionality is desired, di- or trialkanolamines are used as the starting compound.

Examples of suitable mono-β-alkanolaminea include ethanolamine, 1-(m)ethyl ethanolamine, n-butyl ethanolamine, 1-(m)ethyl isopropanolamine, isobutanolamine, β-cyclohexanolamine, n-butyl isopropanolamine and n-propanolamine.

Examples of suitable di-β-alkanolamines are 3-amino-1, 2-propanediol, 2-amino-1,3-propanediol diisobutanolamine (bis-2-hydroxy-1-butyl)amine), di-β-cyclohexanolamine and diisopropanolamine (bis-2-hydroxy-1-propyl)amine).

A suitable trialkanolamine is, for example, tris(hydroxymethyl)aminomethane.

Preferably a β-alkyl-substituted β-hydroxyalkylamide is used. Examples are (di) isopropanolamine, cyclohexyl isopropanolamine, 1-(m)ethyl isopropanolamine, (di) isobutanolamine, di-β-cyclohexanolamine and/or n-butyl isopropanolamine.

This results in polymer compositions with improved resistance to hydrolysis.

Most preferable are diisopropanolamine and diisobutanolamine.

The anhydride: alkanolamine equivalent ratio is generally between 1.0:1.0 and 1.0:1.8. Preferably, this ratio is between 1:1.05 and 1:1.5.

The compound according to the invention can also be obtained via a reaction between an alkanolamine, as for example described above, and a compound containing one acid group and one activated acid group, after which a polyesteramide is obtained through polycondensation.

The compound containing an acid group and an activated acid group is preferably a compound according to formula (XI):

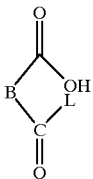

in which

B has the meaning specified above and

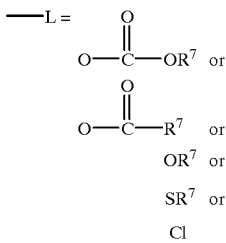

in which $R^7$ is a ($C_1$–$C_{12}$) branched or linear alkyl group.

Examples of suitable compounds containing one acid group and one activated acid group are alkyl esters, such as, for example, mono(m)ethyl adipate and mono(m)ethyl sebacate, anhydrides and thioesters.

The compound according to the invention can also be obtained via a reaction between a cyclic anhydride, as for example described above, and an alcohol, after which the reaction product obtained reacts in situ with an alkanolamine and a polyesteramide is subsequently obtained through polycondennation.

Examples of suitable alcohols are ($C_1$–$C_{10}$) alcohols.

Preferably, methanol or ethanol is used.

In addition to hydroxyalkylamide groups, the polymer may also contain carboxyl groups, in amounts of between 0.01 and 2.0 mg equivalent/gram of polymer. The number of carboxylic acids present in the polymer can be controlled via the anhydride/alkanolamine ratio and via the degree of conversion. If an alkanolamine excess is used and the polycondensationreaction is (almost) complete, less than 0.2 mg equivalent acid/gram of polymer is usually present. If carboxyl groups are present, they may in a subsequent step react with compounds containing one or more groups that can react with carboxylic acid, such as for example epoxy groups or P-hydroxyalkylamide groups. The amount of carboxylic acid is preferably as low as possible, for example between 0.01 and 0.2 mg equivalent/gram of polymer.

The degree of branching and the functionality of the polymer are dependent on the starting materials and the molecular weight of the polymer. A molecular weight higher than 2000 and the use of di- and/or trialkanolamines generally lead to highly branched structures with a functionality of ≧10.

Due to the presence in amounts of less than 10% by weight (of the total amount of anhydrides) of bis- and dianhydrides instead of the anhydrides according to formula (IX) it is possible that the polymer does not comprise only products according to formulas (III)–(V).

The invention also relates to entirely or partly modified polymers.

The modification can for example take place via a reaction between the polymer according to any one of formulas (III), (IV) or (V) with a monomer, oligomer or polymer containing reactive groups that can react with the hydroxyalkylamide.

Examples of suitable reactive groups include carboxyl groups, carboxylic esters, carboxylic anhydrides, epoxy groups, alkoxysilane groups, isocyanate groups, acid chloride groups, epoxychlorohydrine groups, amine groups, phenolic groups, methylolated amidegroups and combinations hereof.

Preferably the monomer, oligomer or polymer contains only one group that can react with hydroxylalkylamide, as a result of which no crosslinking takes place during the modification.

The polymer according to formula (III), (IV) or (V) has preferably been modified with a compound containing a carboxylic acid group.

A modified polymer can for example be, represented by one of the formulas (III), (IV) or (V) in which

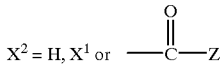

and in which

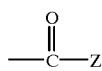

is derived from a monomeric, oligomeric or polymeric monofunctional carboxylic acid.

Suitable carboxylic acids are, for example, saturated aliphatic ($C_1$–$C_{26}$) acids, unsaturated ($C_1$–$C_{20}$) fatty acids, aromatic acids and α,β-unsaturated acids.

Examples of suitable α,β-unsaturated acids are (meth) acrylic acid, crotonic acid and monoesters or monoamides of itaconic acid, maleic acid, 12-hydroxystearic acid, polyether carboxylic acid, and fumaric acid.

Suitable saturated aliphatic acids are for example acetic acid, propionic acid, butyric acid, 2-ethyl hexanoic acid, laurylic acid and stearic acid.

Suitable aromatic acid are for example benzoic acid and tertiairy butyl benzoic acid.

Z can be chosen from, for example, a saturated or unsaturated ($C_1$–$C_{40}$) alkyl or aromatic group, a polymer or an oligomer. Examples of suitable polymers are polyesters, polyethers and poly (capro)lactones.

Z can be substituted with for example ester groups, ether groups, amide groups and alcohol groups.

The modified polymer may consist of the same or different Z groups.

The branched polymer according to the invention can also react with a diisocyanate, after which the isocyanate-functional polymer obtained reacts with a compound capable of reacting with isocyanates. As the diisocyanate use is preferably made of a compound Containing two or more isocyanate groups with different reactivities. This is preferably an aliphatic diisocyanate with one sterically more accessible isocyanate group bound to a primary carbon atom and one sterically less accessible isocyanate group bound to a tertiary carbon atom.

Examples of suitable diisocyanates are 1,4-diisocyanato-4-methyl-pentane, 1,5-diisocyanato-5-methylhexane, 3(4)-isocyanatomethyl-1-methylcyclohexylisocyanate, 1,6-diisocyanato-6-methyl heptane, 1,5-diisocyanato-2,2,5-trimethylhexane and 1,7-diisocyanato-3,7-dimethyloctane, and 1-isocyanato-1-methyl-4-(4-isocyanatobut-2-yl)-cyclohexane, 1-isocyanato-1,2,2-trimethyl-3-(2-isocyanatoethyl) cyclopentane, 1-isocyanato-1,4-dimethyl-4-isocyanatomethyl-cyclohexane, 1-isocyanato-1,3-dimethyl-3-isocyanatomethyl-cyclohexane, 1-isocyanatol-n-butyl-3-(4-isocyanatobut-1-yl)-cyclopentane and 1-isocyanato-1,2-dimethyl-3-ethyl-3-isocyanatomethyl-cyclopentane, respectively.

The preferred isocyanates are 3(4)isocyanato-methyl-1-methylcyclohexylisocyanate (IMCI) and isophorone diisocyanate.

Monomers, oligomers and polymers can all be used as the compounds that can react with isocyanate 30 groups. Such compounds contain reactive groups that can form a chemical bond with isocyanate groups.

Examples of suitable reactive groups are alcohols and amine groups.

Examples of suitable compounds are hydroxyethyl(meth)acrylate, hydroxy($C_2$–$C_{12}$)alkyl vinyl ether, 4-hydroxybutyl (meth)acrylate, aminopropyl vinyl ethers, aminoalkyl vinyl ether, aminopropyl-tri(m)ethoxysilane and aminoalkyltrialkoxysilane.

Preferably the diisocyanate, for example IMCI, is combined with a selective catalyst, as a result of which no chain lengthening or crosslinking will take plane.

As the catalyst use can be made of an ionogenic metal complex based on a metallic element from any one of groups III, IV or VII of the Periodic System with exchangeable counterions. Examples of suitable catalysts are titanium (IV) butoxide, zirconium (IV) acetylacetonate, zirconium (IV) butoxide, tin (IV) acetate, manganese (III) acetylacetonate, titanium (IV) isopropoxide, zirconium (IV) 2-ethylhexanoate and tin (IV) chloride.

The modified and the unmodified polymers can be very widely used in technically different fields, both in thermosetting and in thermoplastic applications. Examples are powder-paint compositions, coating systems based on water or solvent, can- or coil-coating systems, radiation-curable coating compositions, alkyd resins for coatings, unsaturated resins for construction purposes (for example putties, sealants, castings, compounds and molding compounds), inks, toner, (film formers for glass fibre sizings, adhesives, hot melts and in rubber compositions.

Unmodified or partly modified polymers according to the invention will generally be used in powder-paint systems, in can- or coil-coating systems or in solvent-based coating systems.

If the modification has been realized with the aid of for example fatty acids, the polymers according to the invention can be used as airdrying systems.

A modification with radically curable compounds offers possibilities in the technical fields of radiation-curable coatings and construction resins.

Considering the many possibilities of modification of the polymer according to the invention, modification can be directed at any of a wide range of technical applications.

The polymers according to the invention can be used in thermosetting powder-paint compositions. Preferably use is made of the polymers containing hydroxyalkylamide groups.

Thermosetting powder paints have a better resistance to chemicals than thermoplastic powder paints. As a result of this, intensive efforts have for a long time been made to develop crosslinkers and polymers for thermosetting powder coatings. Attempts are still being made to find binder compositions for thermosetting powder paints with a good flow behaviour, good storage stability and a good reactivity. A thermosetting powder-paint binder composition generally contains more than 50 wt. % polymer and less than 50 wt. % crosslinker.

The polymer according to the invention can be used in a powder-paint composition as a polymer and as a crosslinker.

The glass transition temperature (Tg) of the polymer according to the invention lies between 0° C. and 150° C., preferably between 50° C. and 110° C., depending on the selected starting materials and the molecular weight.

Preferably a compound according to any one of formulas (I), (II), (III), (IV) or (V) is used in powder-paint compositions. It is also possible to use a polymer in which up to for example 50 wt. %, preferably less than 30 wt. %, of the hydroxyalkylamide groups are modified.

A coating that ultimately obtained with a powder paint must meet many varying requirements. Various systems are known. Some systems release volatile components during the curing. These systems present the drawback that they form coatings with bubbles and/or that undesirable emissions are released. As far as the latter is concerned, the volatile component, if organic in origin, may cause undesirable environmental or health problems. It has moreover been found that all the desired properties of the powder paint or powder coating are not always realized.

Systems comprising hydroxyalkylamide crosslinkers, such as for example according to EP-A-322834, contain bubbles above a layer thickness limit of about 100 $\mu$m as a result of the reaction water released.

In other systems use is made of polyesters and the usual crosslinkers containing an epoxy group. No volatile components are generally released from these systems. However, the use of bisphenol-A-epoxy resins in the so-called hybrid systems results in coatings that exhibit a relatively great extent of yellowing and powdering when exposed to UV light, while the frequently used triglycidyl-isocyanurate (TGIC) crosslinker is toxicologically suspect.

It has been found that use of the polymer according to the invention as the crosslinker in binder compositions for powder paints results in a combination of highly desirable properties such as for instance good flow behaviour and good resistance to chemicals, desired gloss without bubble formation at the surface up to and including layer thicknesses of at least 120 $\mu$m, a high resistance to scratching, good mechanical properties, good powder stability, good weather resistance and good colour stability of the powder coating.

It is surprising that use of the highly functional crosslinkers according to the invention leads to good flow behaviour, because generally a crosslinker having a functionality higher than, for example, 6 results in reduced flow behaviour.

Depending on the final application desired, the crosslinker according to the invention described above can also be used in combination with another crosslinker, such as for example triglycidyl isocyanurate (TGIC), polybisphenol-A-epoxides such as, for instance, the various Epikote™ grades, compounds containing (blocked) isocyanate groups, such as for example the caprolactam-blocked isophorone diisocyanate trimer, crosslinkers containing β-hydroxyalkylamide groups such as for example Primid XL 522™ (Rohm and Haas) and/or polyfunctional oxazolines. The weight ratio between the crosslinkers can be selected depending on the final application.

The crosslinker according to the invention is preferably combined with a crosslinker comprising at least one linear or branched aliphatic chain with 5–26 carbon atoms and having an epoxy functionality of more than 1, with the proviso that the epoxy groups are carried on the at least one aliphatic chain. These crosslinkers are described in EP-A-600546 and include, for example, epoxidized oils in which the oil is linseed oil, soybean oil, safflower oil, oiticica oil, carraway seed oil, rapeseed oil, castor oil, dehydrated castor oil, cottonseed oil, wood oil, vernonia oil (a natural oil), sunflower oil, peanut oil, olive oil, soyleaf oil, maize oil, fish oil such as, for instance, herring or sardine oil, and non-cyclic terpene oils.

The epoxidized oil is preferably epoxidized soybean oil and/or epoxidized linseed oil.

As the crosslinker, a powder-paint-binder composition may contain the polymer according to the invention and as the polymer a polymer containing carboxyl groups or containing anhydride groups.

A polyester, a polyacrylate, a polyether (such for example a polyether based on bisphenol or a phenol-aldehyde novolak), a polyurethane, a polycarbonate, a trifluoroethylene copolymer or a pentafluoropropylene copolymer, a polybutadiene, a polystyrene or a styrene maleic anhydride copolymer can for example be chosen as the polymer.

Generally, polymers having an acid value higher than 40 mg KOH/gram resins are applied because a relatively high acid value results in better reactivity with the polymer according to the invention.

The molecular weight (Mn) of this polymer is usually higher than 800, but preferably higher than 1500. The polymer must flow well at temperatures between 100° C. and 200° C. and therefore has a molecular weight (Mn) that is lower than approximately 10,000, preferably lower than approximately 7000.

This polymer generally has a viscosity at 158° C. that is lower than 8000 dPas, The viscosity will usually be higher than 100 dPas. The viscosity can advantageously vary from approximately 300 to approximately 5000 dPas. The viscosity used here was measured according to the Emila method described by Misev in Powder Coatings; Chemistry and Technology, pages 287–288 (1991)

The Tg of this polymer is generally higher than approximately 20° C., preferably higher than 30° C., and may be higher than 40° C. The polymer's Tg is usually lower than 120° C. because otherwise the binder composition may become somewhat difficult to prepare. As already indicated above, the choice of the polymer's Tg can be based on the Tg recommended for the binder composition.

If use is made of polymers having only terminal groups that can react with a hydroxyalkylamide functionality, the polymer has an average functionality (capable of reacting with the hydroxyalkylamide groups) of more than 1.6, preferably more than 2. The polymer generally has an average functionality of less than 10, preferably less than approximately 6. If use is made of polymers—such as polyacrylates—with appended functional groups, the average functionality will be higher than approximately 1.6, and preferably higher than 2. Such a polymer generally has an average functionality of less than 8, preferably less than 4.

Most preferable of the suitable polymers are polyesters and polyacrylates.

With the polymers described various properties can be obtained in the binder and in the powder coating itself. Polyacrylates are highly resistant to yellowing and to weather influences. The polyacrylates that can be used as the polymer may be based on (meth)acrylic acid, methyl(meth) acrylate, ethyl(meth)acrylate, butyl(meth)acrylate, propyl (meth)acrylate, 2-ethylhexyl(meth)acrylate, cyclohexyl (meth)acrylate, decyl(meth)acrylate, isodecyl(meth) acrylate, benzyl(meth)acrylate and hydroxyalkyl(meth) acrylates such as hydroxyethyl and hydroxypropyl(meth) acrylate and/or glycidyl esters or glycidyl ethers of alkyl (meth)acrylates.

The polyacrylates can be obtained via known processes. In these processes use can be made of comonomers such as for instance styrene, maleic acid or maleic anhydride and of small amounts of ethylene, pro-pylene and acrylonitrile. Other vinyl or alkyl monomers, such as octene, triallyl isocyanurate and diallyl phthalate, can be added in small amounts.

A polyacrylate containing acid groups is generally obtained through copolymerization of the desired amount of acid, such as for example (meth)acrylic acid, maleic acid or fumaric acid.

The polyacrylate's viscosity usually lies between 100 and 8000 dPas (measured at 158° C.; Emila).

Polyacrylates are described in the patents U.S. Pat. No. 3,752,870, U.S. Pat. No. 3,787,340 and U.S. Pat. No. 3,758,334 and in the British patent 1,333,361, and what is disclosed in said patents is included herein by means of this reference.

The polyurethanes that can be used as the polymer that can react with β-hydroxyalkylamide groups include for example also the polyurethanes terminated with an acid group and a (blocked) isocyanate group.

Polyesters are usually based on the residues of aliphatic polyalcohols and polycarboxylic acids.

The polycarboxylic acids are generally chosen from the group consisting of aromatic and cycloaliphatic polycarboxylic acids because these acids usually have a Tg-raising effect on the polyester. In particular, use is made of dibasic acids. Examples of polycarboxylic acids are isophthalic acid, terephthalic acid, hexahydroterepthalic acid, 2,6-naphthalene dicarboxylic acid and 4,4-oxybisbenzoic acid and, subject to availability, their anhydrides, acid chlorides or lower alkyl esters, such as for example the dimethyl ester of naphthalene dicarboxylic acid. Although not required, the carboxylic acid component generally contains at least approximately 50 mol. %, preferably at least approximately 70 mol. %, isophthalic acid and/or terephthalic acid.

Other suitable aromatic cycloaliphatic and/or acyclic polycarboxylic acids are for example 3,6-dichlorophthalic acid, tetrachlorophthalic acid, tetrahydrophthalic acid, hexahydroterephthalic acid, hexachloroendomethylene tetrahydrophthalic acid, phthalic acid, azelaic acid, sebacic acid, decanedicarboxylic acid, adipic acid, succinic acid, trimellitic acid and maleic acid. These different carboxylic acids can be used in amounts of at most 50 mol. % of the total amount of carboxylic acids. These acids can be used as such or, subject to availability, in the form of their anhydrides, acid chlorides or lower alkyl esters.

Hydroxycarboxylic acids and/or optionally lactones can also be used, for example 12-hydroxystearic acid, hydroxypivalic acid and ε-caprolactone. If so desired, monocarboxylic acids, such as benzoic acid, tert.-butylbenzoic acid, hexahydrobenzoic acid and saturated aliphatic monocarboxylic acids can be used in smaller amounts.

The polyalcohols, in particular diols, that can be caused to react with the carboxylic acids to obtain the polyester include aliphatic diols such as for example ethylene glycol, propane-1,2-diol, propane-1,3-diol, butane-1,2-diol, butane-1,4-diol, butane-1,3-diol, 2,2-dimethylpropanediol-1,3 (=neopentyl glycol), hexane-2,5-diol, hexane-1,6-diol, 2,2-bis-(4-hydroxy-cyclohexyl)-propane (hydrogenated bisphenol-A), 1,4-dimethylolcyclohexane, diethylene glycol, dipropylene glycol and 2,2-bis[4-2-hydroxylethoxy)-phenyl]propane and the hydroxypivalic ester of neopentyl glycol.

Small amounts, such as less than approximately 4 wt. %, but preferably less than 2 wt. %, of trifunctional alcohols or acids can be used to obtain branched polyesters. Examples of suitable polyols and polyacids are glycerol, hexanetriol, trimethylolethane, trimethylolpropane, tris-(2-hydroxyethyl) isocyaturate and trimellitic acid.

Tetrafunctional monomers are usually not preferred, because they can cause excessive branching or gelling, although it is possible to use them in very small amounts. Examples of suitable polyfunctional alcohols and acids are sorbitol, pentaerythritol and pyromellitic acid. Trifunctional monomers are however preferred for synthesizing branched polyesters.

The coating properties can be influenced via for example the choice of diol. If for example good weather resistance is required, the alcohol component preferably contains at least 70 mol. % neopentyl glycol, 1,4-dimethylolhexane and/or hydrogenated bisphenol-A. Caprolactone and hydropivalic acid can also be used if good weather resistance is required.

The polyesters are prepared via the usual processes, through esterification or trans-esterification, optionally in the presence of the usual esterification catalysts such as for example dibutyl tin oxide or tetrabutyl titanate. The preparation conditions and the COOH/OH ratio can be chosen so that end products having an acid number or hydroxyl value that lies within the desired range of values are obtained.

A carboxylic-acid-functional polyester is preferably prepared in a series of steps. In the last step thereof an aromatic or, preferably, aliphatic acid is esterified so that an acid-functional polyester is obtained. As known to a person skilled in the art, terephthalic acid is in a first step caused to react in the presence of excess diol. Such reactions result in a substantially hydroxyl-functional polyester. In a second or subsequent step an acid-functional polyester is obtained by causing further acid to react with the product of the first step. Further acids are for example isophthalic acid, adipic acid, succinic anhydride, 1,4-cyclohexanedicarboxylic acid and trimellitic anhydride.

Preferably trimellitic anhydride is used at a temperature of 170–200° C., because then a polyester with a relatively large number of trimellitic acid terminal groups is obtained, as a result of which the reactivity of the binder system is increased and better coating properties are obtained.

The polyester may be a crystalline polyester, but amorphous polyesters are preferred. Mixtures of crystalline and amorphous polyesters can also be used. Amorphous polyesters have a viscosity that generally lies within a range from 100 to 8000 dPas (measured at 158° C., Emila). Crystalline polyesters usually have a lower viscosity in the range from approximately 2 to approximately 200 dPas.

If the polyester contains groups that can react with carboxylic acid, the polyester's acid number is chosen so that the desired amount of crosslinker can be used. The acid number is preferably higher than 10 and more preferably higher than 40.

The polyester's Tg is chosen so that the Tg of the polyester-crosslinker mixture lies between for example 30° C. and 80° C., as a result of which powder paints or binders prepared from them are physically stable at room temperature. Combinations of polyester and crosslinker having a lower Tg can optionally be used in the preparation of a powder coating composition. To retain the powder stability, such powders are however stored in cooled condition.

The selection of the polymer: crosslinker weight ratio depends on the desired final application and this ratio will generally be between 60:40 and 90:10, preferably between 75:25 and 85:15.

If the polymer according to the invention is used as a resin in powder-paint compositions, compounds containing two or more functional groups that can react with 5-hydroyyamide groups can be used as the crosslinker. Examples of such groups are anhydrides, carboxylic acids, carboxylic esters, epoxides, isocyanates and alkoxysilanes. Preferably anhydride groups, carboxylic acids and blocked isocyanates are used. Examples are adipic acid, decanedicarboxylic acid, trimellitic anhydride, phthalic acid or phthalic anhydride, tetrahydrophthalic acid or tetrahydrophthalic anhydride, hexahydrophthalic acid or hexahydrophthalic anhydride and IPDI-trimer or HDI-trimer, optionally blocked with caprolactam or triazole.

The preparation of thermosetting powder coatings in general and the chemical reactions for curing powder paints to form cured coatings are described by Mioev in Powder Coatings, Chemistry and Technology (1991, John Wiley) on pp. 42–54, pp. 148 and 224–226. A thermosetting binder composition is generally defined as the resinous part of the powder paint consisting of polymer and crosslinker. If so desired, the usual additives can be used in the binder composition and in the powder-paint system according to the invention, such as for example pigments, fillers, degassing agents, flow agents and stabilizers. Suitable pigments are for example inorganic pigments, such as for example titanium dioxide, zinc sulphide, iron oxide and chromium oxide, and also organic pigments such as for example azo compounds. Suitable fillers are for example metal oxides, silicates, carbonates and sulphates.

Primary and/or secondary antioxidants, UV stabilizers such as quinones, (sterically hindered) phenolic compounds, phosphonites, phosphites, thioethers and HALS compounds (hindered amine light stabilizers) can for example be used as stabilizers.

Examples of degassing agents are benzoin and cyclohexane dimethanol bisbenzoate. The flow agents include for example polyalkylacrylates, fluorohydrocarbons and silicone fluids. Other suitable additives are for example additives for improving tribocharging, such as sterically hindered tertiary amines that are described in EP-B-371528.

Powder paints according to the invention can be applied in the usual manner, for example by electrostatically spraying the powder onto an earthed substrate and curing the coating by exposing it to heat at a suitable temperature for a sufficient length of time. The applied powder can for example be heated in a gas oven, an electric oven or with the aid of infrared radiation.

Thermosetting coatings of powder-paint (coating) compositions intended for industrial applications are described further in a general sense in Powder Coatings, Chemistry and Technology, Misev, pages 141–173 (1991).

Compositions according to the present invention can be used in powder paints for use on, for example, metal, wooden and plastic substrates. Examples are industrial coatings, coatings for machines and tools, household applications and parts of buildings. The coatings are also suitable for use in the automotive industry for coating parts and accessories.

DE-A-19703952 discloses a copolyester containing μ-hydroxyalkylamide groups as endgroups. The polyester polymer backbone does not comprise amide groups. The copolyester is prepared in a three step process by mixing a hydroxy polyester with a polycarboxylic acid dialkyl ester to form an alkylester group containing copolyester followed by reaction with an aminoalcohol. In contrast, the polymer according to the invention is a polyesteramide having amide and ester groups along the backbone in addition to the p hydroxyalkylamide endgroups. This polyesteramide results in improved mechanical coating properties by more extensive hydrogen bridge formation, improved crosslinkdensity and improved hydrolysis resistance.

The invention will be elucidated with reference to the following, non-limiting examples.

EXAMPLE I

Preparation of a Highly Branched Polymer Comprising Units of Phthalic Anhydride and Diisopropanolamine 384 g of phthalic anhydride and 415 g of diisopropanolamine were introduced into a double-walled glass reactor, which could be heated by means of thermal oil, fitted with a mechanical stirrer, a distillation head and nitrogen and vacuum connections. The reaction mixture was gradually heated, with stirring, to approx. 70° C. and then more slowly to 170° C. A vacuum was created during the heating. The pressure in the reactor was adjusted to the release of reaction water, so that this could be removed from the reactor through distillation. After a total reaction time of 6 hours the viscous polymer contained less than 0.1 meq/g carboxylic acid (titrimetrically determined) and no more water could be removed through distillation. After cooling the polymer was obtained as a very pale yellow glassy mass. The concentration of hydroxyl groups was titrimetrically found to be 5.4 meq/g. The number average molecular mass was determined with the aid of GPC (universal calibration) and was 1500 g/mol; the weight average molecular mass was 7700 g/mol.

EXAMPLE II

Preparation of a Highly Branched Polymer Comprising Units of Phthalic Anhydride and Diisopropanolamine 232 g of phthalic anhydride and 270 g of diisopropanolamine were introduced into a double-walled glass reactor, which could be heated by means of thermal oil, fitted with a mechanical stirrer, a distillation head and nitrogen and vacuum connections. The reaction mixture was gradually heated, with stirring, to approx. 70° C. and then more slowly to 170° C. A vacuum was created during the heating. The pressure in the reactor was adjusted to the release of reaction water, so that this could be removed from the reactor through distillation. After a total reaction time of 5 hours the viscous polymer contained less than 0.2 meq/g of carboxylic acid (titrimetrically determined) and no more water could be removed through distillation. After cooling the polymer was obtained as a pale yellow glassy mass. The concentration of hydroxyl groups was titrimetrically found to be 5.8 meq/g. The number average molecular mass was determined with the aid of OPC (universal calibration) and was 1100 g/mol; the weight average molecular mass 4900 g/mol.

EXAMPLE III

Preparation of a Highly Branched Polymer Comprising Units of Hexahydrophthalic Anhydride and Diisopropanolamine 398 g of hexahydrophthalic anhydride and 408 g of diisopropanolamine were introduced into a double-walled glass reactor, which could be heated by means of thermal oil, fitted with a mechanical stirrer, a distillation head and nitrogen and vacuum connections. The reaction mixture was gradually heated, with stirring, to approx. 70° C. and then more slowly to 160° C. A vacuum was created during the heating. The pressure in the reactor was adjusted to the release of reaction water, so that this could be removed from the reactor by means of distillation. After a total reaction time of 3.5 hours the viscous polymer contained less than 0.2 meq/g of carboxylic acid (titrimetrically determined) and no more water could be removed through distillation. After cooling the polymer was obtained as an almost colourless glassy mass. The concentration of hydroxyl groups was titrimetrically found to be 5.2 meq/g. The number average molecular mass was determined with the aid of GPC (universal calibration) and was 1550 g/mol; the weight average molecular was mass 7000 g/mol.

EXAMPLE IV

Preparation of a Highly Branched Polymer Comprising Units of Hexahydrophthalic Anhydride and Diisopropanolamine 378 g of hexahydrophthalic anhydride and 436 g of diisopropanolamine were introduced into a double-walled glass reactor, which could be heated by means of thermal oil, fitted with a mechanical stirrer, a distillation head and nitrogen and vacuum connections. The reaction mixture was gradually heated, with stirring, to approx. 70° C. and then more slowly to 160° C. A vacuum was created during the heating. The pressure in the reactor was adjusted to the release of reaction water, so that this could be removed from the reactor through distillation. After a total reaction time of 5 hours the viscous polymer contained less than 0.1 meq/g carboxylic acid (titrimetrically determined) and no more water could be removed through distillation. After cooling the polymer was obtained as an almost colourless glassy mass. The concentration of hydroxyl groups was titrimetrically found to be 6.1 meq/g. The number average molecular mass was determined with the aid of GPC (universal calibration) and was 1010 g/mol; the weight average molecular mass 4600 g/mol.

EXAMPLES V–VIII

Powder-paint Compositions Comprising a Polymer According to Any One of Examples I–IV Powder-paint compositions according to Table 1 were prepared by mixing and extrusion (PRISM extruder, 120° C). The polyesters (Uralac 5040™ and Uralac 5261™ from DSM Resins) comprise units of terephthalic acid, adipic acid, neopentyl glycol and trimellitic anhydride.

The compositions were in the usual manner ground, sieved and electrostatically sprayed (Corona) onto aluminium and steel test panels. After a cure cycle of 10 minutes at 200° C. or 15 minutes at 180° C. in a circulation oven, the panels were tested to determine their appearance (visually), flexibility (penetration in mm according to Erichsen ISO 1520/DIN 53156), reverse impact resistance (ASTM-2794/69 in inch-pound), acetone resistance (acetone double rubs), adhesion (cross hatch adhesion test) and hardness (König, seconds). The test results are shown in Table 1.

These examples show that the polymers according. to the invention result in coatings having good to very good chemical, mechanical and optical properties and a high blister limit (visually).

TABLE 1

| | Compositions and coating properties | | | | | |
|---|---|---|---|---|---|---|
| Composition | A | B | C | D | E | F |
| Polyester resin: | | | | | | |
| Uralac p5261 ™ | 155 g | | | 159 g | | 164 g |
| Uralac p5040 ™ | | 156 g | 162 g | | 160 g | |
| Crosslinker according to: | | | | | | |
| Example I | 45 g | 44 g | | | | |
| Example II | | | 38 g | | | |
| Example III | | | | 43 g | 42 g | |
| Example IV | | | | | | 36 g |
| Additives: | | | | | | |
| TiO$_2$ 2160 | 100 g | 100 g | 100 g | 100 g | 100 g | 100 g |
| Benzoin | 3.0 g | 3.0 g | 3.0 g | 3.0 g | 3.0 g | 3.0 g |
| BYK 361 | 1.5 g | 1.5 g | 1.5 g | 1.5 g | 1.5 g | 1.5 g |
| cure cycle | 10' 200° C. | 10' 200° C. | 10' 200 ° C. | 15' 180° C. | 15' 180° C. | 15' 180° C. |
| Hardness | 235 s | 225 s | 215 s | 215 s | 210 s | 195 s |
| Impact resistance[1] | >160 ip | 160 ip | >160 ip | >160 ip | >160 ip | >160 ip |
| ESP[2] | >8 mm | >8 mm | >8 mm | >8 mm | >8 mm | >8 mm |
| Adhesion[3] | Gt0 | Gt0 | Gt0 | Gt0 | Gt0 | Gt0 |
| Gel time[4] | n.d.[5] | 151 | 80 | 116 | 85 | 100 |
| Flow behaviour | OK | OK | OK | OK | OK | OK |
| Blister limit | 120µ | 120µ | 130µ | 140µ | 140µ | 140µ |

[1]reverse impact test; on steel ASTM-2794/69. The impact resistance is usually given as inch × pound. If no cracks are visible in the coating at 160 i.p., 160 i.p. is quoted as the result. An impact resistance of 160 i.p. stands for 1.84 m.kg.
[2]Erichsen Slow Penetration; ISO 1520/DIN 53156
[3]Cross-hatch adhesion; ISO 2409/DIN 5315
[4]DIN 55990; part B.
[5]not determined.

What is claimed is:

1. A powder-paint binder composition containing a branched condensation polymer containing ester groups and at least one amide group in the backbone, having at least one β-alkyl substituted β-hydroxyalkylamide end group, having a β-hydroxylakylamide functionality between 2 and 250 and having a weight average molecular mass of ≧800 g/mol.

2. A powder-paint binder composition according to claim 1 which additionally contains a crosslinker comprising at least one linear or branched aliphatic chain with 5–26 carbon atoms and having an epoxy functionality of more than 1, with the provision that the epoxy groups are carried on the at least one aliphatic chain.

3. A powder paint composition comprising the binder composition according to claim 1.

4. A powder coating obtained by curing of the powder paint according to claim 3.

5. A toner composition comprising a branched condensation polymer containing ester groups and at least one amide group in the backbone, having at least one β-alkyl substituted β-hydroxyalkylamide end group, having a β-hydroxylakylamide functionality between 2 and 250 and having a weight average molecular mass of ≧800 g/mol.

6. A powder-paint binder composition according to claim 1 wherein said branched condensation polymer obtained by reacting a cyclic anhydride with a β-alkyl-substituted β-hydroxylalkylamine to form a hydroxylalkylamide, and subsequently polycondensig the hydroxylalkylamide to form said branched polymer.

7. A toner composition according to claim 5 wherein said branched condensation polymer obtained by reacting a cyclic anhydride with a β-alkyl-substituted β-hydroxylalkylamine to form a hydroxylalkylamide, and subsequently polycondensig the hydroxylalkylamride to form said branched polymer.

8. A powder-paint binder composition according to claim 1, wherein said polymer contains at least two groups according to formula (II)

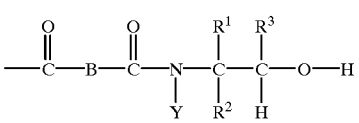

(II)

wherein

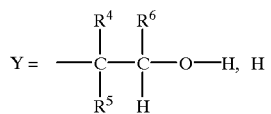

(C$_1$–C$_{24}$)(cyclo)alkyl or (C$_6$–C$_{10}$) aryl,
B=(C$_2$–C$_{24}$), optionally substituted aryl or (cyclo)alkyl aliphatic diradical, and $R^1$, $R^2$, $R^3$, $R^4$, $R^5$ and $R^6$ may, independently from one another, be the same or different, h, $(C_6-C_{10})$ aryl or $(C_1-C_8)$(cyclo)alkyl radical.

9. A powder-paint binder composition according to claim 1, wherein said polymer contains at least two groups according to formula (III)

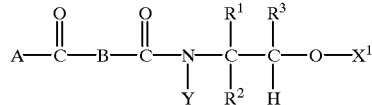
(III)

in which

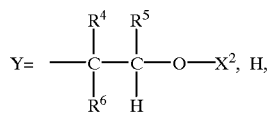

$(C_1-C_{20})$(cyclo)alkyl or $(C_6-C_{10})$aryl,

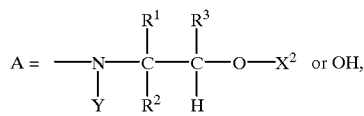

B=$(C_2-C_{24})$, optionally substituted, aryl or (cyclo)alkyl aliphatic diradical,

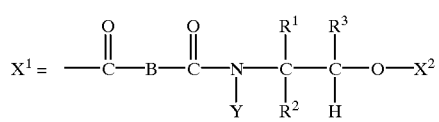

$X^2$=H or $X^1$ and $R^1$, $R^2$, $R^3$, $R^4$, $R^5$ and $R^6$ may be H, $(C_6-C_{10})$ aryl or $(C_1-C_8)$(cyclo)alkyl radical or $CH_2-OX^2$.

10. A powder-paint binder composition according to claim 1, wherein the polymer is represented by formula (IV):

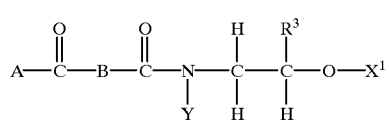
(IV)

in which:

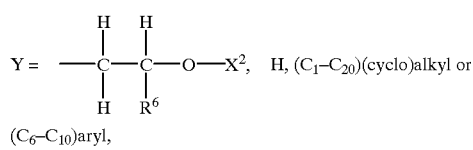

-continued

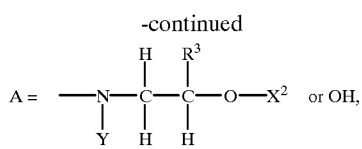

B=$(C_2-C_{24})$, optionally substituted, aryl or (cyclo)alkyl aliphatic diradical,

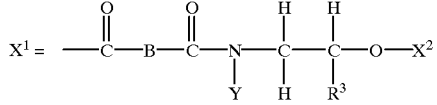

$X^2$=H or $X^1$, $R^3$=H or $(C_6-C_{10})$ aryl or $(C_1-C_8)$(cyclo)alkyl radical, and $R^6$=H or $(C_6-C_{10})$ aryl or $(C_1-C_8)$(cyclo)alkyl radical.

11. A powder-paint binder composition according to claim 1, wherein said polymer is a polymer according to formula (V):

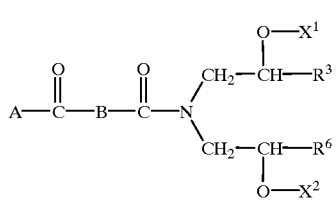
(V)

in which:

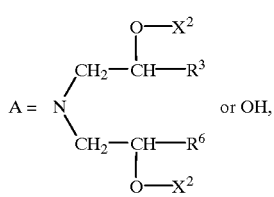

B=$(C_2-C_{12})$, optionally substituted, aryl or (cyclo)alkyl aliphatic diradical,

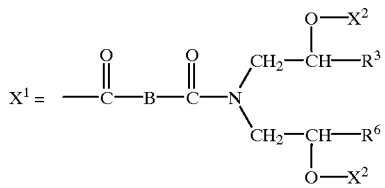

$X^2$=H or $X^1$, $R^3$=$(C_6-C_{10})$ aryl or $(C_1-C_8)$(cyclo)alkyl radical and $R^6$=$(C_6-C_{10})$ aryl or $(C_1-C_8)$(cyclo)alkyl radical.

* * * * *